US009955553B2

(12) United States Patent
Fletcher

(10) Patent No.: US 9,955,553 B2
(45) Date of Patent: Apr. 24, 2018

(54) LIGHT TOWER

(71) Applicant: Heimdall (UK) Limited, Edinburgh (GB)

(72) Inventor: Christopher David Fletcher, Bourne (GB)

(73) Assignee: Heimdall (UK) Limited, Edinburgh (GB)

(*) Notice: Subject to any disclaimer, the term of this patent is extended or adjusted under 35 U.S.C. 154(b) by 81 days.

(21) Appl. No.: 15/000,907

(22) Filed: Jan. 19, 2016

(65) Prior Publication Data
US 2016/0309566 A1 Oct. 20, 2016

(30) Foreign Application Priority Data

Apr. 20, 2015 (EP) .................................. 15164341

(51) Int. Cl.
*H05B 37/02* (2006.01)
*F21L 13/00* (2006.01)
*F21V 21/22* (2006.01)
*F21V 21/14* (2006.01)
*B62D 49/08* (2006.01)
(Continued)

(52) U.S. Cl.
CPC ......... *H05B 37/0227* (2013.01); *B62D 49/08* (2013.01); *F21L 13/00* (2013.01); *F21L 14/04* (2013.01); *F21V 21/145* (2013.01); *F21V 21/22* (2013.01); *F21V 21/36* (2013.01); *G01M 1/12* (2013.01); *B60P 3/18* (2013.01); *F21W 2131/1005* (2013.01); *F21W 2131/402* (2013.01)

(58) Field of Classification Search
CPC ...... H05B 37/0227; G01M 1/12; F21V 21/36; F21V 21/145; F21V 21/22; F21L 14/04; F21L 13/00; B62D 49/08; F21W 2131/1005; F21W 2131/402; B60P 3/18
See application file for complete search history.

(56) References Cited

U.S. PATENT DOCUMENTS 3,439,467 A * 4/1969 Partlow ................. E04H 12/182
182/141
3,858,688 A * 1/1975 Galloway ............... B66F 11/04
182/141

(Continued)

FOREIGN PATENT DOCUMENTS

CN 104048172 9/2014
GB 2491421 A 12/2012
(Continued)

*Primary Examiner* — Darlene P Condra
(74) *Attorney, Agent, or Firm* — Perkins IP Law Group LLC; Jefferson Perkins

(57) ABSTRACT

This invention concerns a light tower (10) having a main body (12) and a mast (26) extending from the main body (12) such that the mast (26) is extendable between a retracted configuration and at least one extended configuration. A lighting unit (34) is mounted to the mast (26). Supports (44), such as legs, are arranged to support the main body in use. Sensors (56) are provided for monitoring the load distribution of the light tower (10) between the supports (44). A controller (64) is configured to alter the load distribution of the light tower (10) according to a comparison between the monitored load distribution and a predetermined acceptable load distribution range.

17 Claims, 4 Drawing Sheets

(51) Int. Cl.
*F21L 14/04* (2006.01)
*F21V 21/36* (2006.01)
*G01M 1/12* (2006.01)
*F21W 131/402* (2006.01)
*B60P 3/18* (2006.01)
*F21W 131/10* (2006.01)

(56) References Cited

U.S. PATENT DOCUMENTS

| | | | | | |
|---|---|---|---|---|---|
| 5,611,177 | A | * | 3/1997 | Herbstritt | B60P 3/18 200/47 |
| 5,655,615 | A | * | 8/1997 | Mick | B60G 5/02 180/24.02 |
| 5,922,039 | A | * | 7/1999 | Welch | H01Q 1/18 280/5.507 |
| 8,016,068 | B2 | * | 9/2011 | Daniel | B60G 5/02 180/24.07 |
| 8,365,471 | B2 | * | 2/2013 | Diniz | E04H 9/16 340/601 |
| 8,439,534 | B1 | * | 5/2013 | Roe | F21V 11/183 362/285 |
| 2012/0199753 | A1 | * | 8/2012 | Chuang | G01V 5/0008 250/390.04 |
| 2013/0039049 | A1 | | 2/2013 | Jones et al. | |
| 2013/0206915 | A1 | * | 8/2013 | Desaulniers | B64C 39/024 244/165 |
| 2013/0301253 | A1 | * | 11/2013 | Drever | F21L 4/02 362/184 |
| 2014/0240968 | A1 | * | 8/2014 | Brown | F21S 9/032 362/183 |
| 2015/0033999 | A1 | * | 2/2015 | Bein | B63B 15/02 114/90 |
| 2016/0186945 | A1 | * | 6/2016 | Knodel | F21S 9/04 362/485 |
| 2016/0202111 | A1 | * | 7/2016 | Fahey | B65D 90/143 177/141 |

FOREIGN PATENT DOCUMENTS

| | | |
|---|---|---|
| GB | 2507033 A | 4/2014 |
| WO | 2006/047836 A1 | 5/2006 |

* cited by examiner

LIGHT TOWER

BACKGROUND OF THE INVENTION

This disclosure relates to light towers, and more particularly, although not exclusively, to a method and system for controlling the safety/stability of a mobile light tower.

Mobile light towers are typically used to provide lighting at locations where there are no fixed light sources, and are commonly used, for example, on building/work sites, at sporting/entertainment events, or in other remote locations. Conventional mobile light towers comprise a main body, an extendable mast, and a lighting unit disposed at the distal end of the mast. The main body typically houses a power source powering the lighting unit, and wheels which give the tower its mobility. The extendable mast can be used to raise or lower the lighting unit to a desired position such that appropriate lighting of an area can be achieved.

Whilst the use of mobile light towers is widespread, conventional mobile light towers can suffer from stability issues, which may cause an inherent safety risk. In particular, when the mast of a mobile light tower is in an extended position, the mast may be exposed to high winds, which may cause the mobile light tower to topple when the wind is strong enough. Furthermore, where the mobile light tower is placed in a location where the ground is unstable or uneven, any shift in the ground, or movement of the mobile light tower relative to the ground, may cause the mobile light tower to topple.

The weight of mobile light towers not only provides a safety risk to individuals when it is toppled but also can cause significant damage to the tower itself or adjacent equipment.

It has previously been proposed in GB 2491421 to provide a mobile light tower comprising a wind sensor and a controller for lowering the mast from an extended position in response to high wind speeds. Such a mobile light tower may reduce the risk of the tower toppling only based on the magnitude of the wind speed. It has been found that the direction of the wind speed relative to the lighting rig on the mast can make a significant difference in the toppling load on the mast and thus relatively low wind speeds hitting the lighting equipment front on can provide an equal, or even greater risk of toppling the light tower. Furthermore, this mobile light tower does not reduce the risk of toppling in response to any other unsafe situations, such as, for example, the tower being positioned an incline or a shift in the ground upon which the mobile light tower is located.

The nature of gusting winds means that the tower can become unsafe very quickly, particularly when located on uneven ground.

It may be considered an aim of the invention to provide a lighting tower that offers improved stability. There has now been devised a mobile light tower, a controller for a mobile light tower, and a method of controlling a mobile light tower, which overcome or substantially mitigate the aforementioned and/or other disadvantages associated with the prior art.

BRIEF SUMMARY OF THE INVENTION

According to a first embodiment of the present invention there is provided a light tower comprising a main body, a mast extending from the main body, the mast being extendable between a retracted configuration and at least one extended configuration, a lighting unit mounted to the mast, a plurality of supports for supporting the main body in use, sensors for monitoring the load distribution of the light tower between the supports, and a controller configured to alter the load distribution of the light tower according to a comparison between the monitored load distribution and a predetermined acceptable load distribution range.

The light tower controller may be configured to alter the load distribution of the light tower when the monitored load distribution is outside a pre-determined range of load distributions. The controller may act to stabilise the tower when the load distribution of the light tower is altered due to a variety of external forces, for example, high winds acting on the mast, or a shift in the ground upon which the light tower is located, e.g. caused by loose/soft ground or vibrations. Additionally or alternatively, the controller may inhibit raising of the mast when the load distribution is outside the predetermined range.

The controller may act to alter/control the load distribution such that the light tower is at reduced risk of toppling. Furthermore, monitoring of a property of the light tower itself, as opposed to monitoring a property of any single external force acting on the light tower, may allow for more sensitive measurements and may allow for a more accurate prediction of the whether the light tower is at risk from toppling.

The load distribution as referred to herein typically comprises the weight distribution of the light tower. The load distribution may comprise additional loading to the supports, or adjustment to the weight distribution, caused by external forces.

The controller may be configured to bring the load distribution of the light tower within the pre-determined range of load distributions when the monitored load distribution is outside the pre-determined range of load distributions.

The pre-determined range of load distribution may be a range of weight/load distributions within which the light tower is not at risk of toppling. A load distribution within the pre-determined range of load distributions may be a so-called "safe" weight distribution. One or more limit of the range of pre-determined load distributions may comprise a threshold value at which, or above which, the light tower is at risk of toppling.

The predetermined range of load distribution may comprise a predetermined region, an area or volume, for the location of the centre of mass/gravity of the light tower and/or a predetermined ratio of loading between the supports.

The controller may monitor the position of the centre of mass of the light tower, e.g. according to the received sensor readings. The controller configured to alter the position of the centre of mass of the light tower when the monitored position of the centre of mass is outside a pre-determined range of positions for the centre of mass. The controller may be configured to shift the position of the centre of mass of the light tower to within the pre-determined range of positions for the centre of mass when the monitored position of the centre of mass is outside the pre-determined range.

The pre-determined range of positions for the centre of mass may be a range of positions for the centre of mass within which the light tower is not at risk of toppling, i.e. a location at which the weight of the light tower serves to counteract external forces or a toppling moment applied to the tower.

The controller may be configured to raise and/or lower the mast, e.g. relative to the main body, when the monitored weight distribution is outside the pre-determined acceptable weight distribution range. Raising and/or lowering the mast may thereby alter the weight distribution of the light tower, allowing the weight distribution to be brought back to a safe weight distribution where there is no risk of toppling.

The controller may be configured to lower the mast from its at least one extended configuration to a partially or fully retracted configuration. Where the mast has a plurality of extended configurations, e.g. different/incremental height settings, the controller may be configured to lower the mast from one extended configuration to another of its extended configurations, which may be at a lower height than the initial extended configuration.

The controller may be configured such that if the load distribution of the light tower cannot be brought within the pre-determined range of load distributions, then the mast is lowered into its retracted configuration. The controller may be configured to inhibit raising of the mast from its retracted condition unless the load distribution falls within the pre-determined range of load distributions.

The controller may be configured to raise and/or lower the mast by discrete pre-determined amounts, or may be configured to raise and/or lower the mast along a continuous spectrum of heights until the load distribution falls within the pre-determined range of load distributions.

The controller may be configured to lower the mast when the monitored load distribution is outside the pre-determined range of load distributions, and/or may be configured to raise the mast when the monitored load distribution is within the pre-determined range of load distributions. The controller may be configured to maintain the load distribution of the light tower within the pre-determined range of load distributions for a pre-determined period of time once the mast has been lowered due to unsafe conditions, e.g. by maintaining the mast in its lowered position.

The controller may be configured to lower the mast when the monitored load distribution is outside the pre-determined range of load distributions for longer than a pre-determined period of time, and may be configured to raise the mast when the monitored load distribution is within the pre-determined range of load distributions for longer than a pre-determined period of time. Thus the controller may take into account transient variations in the load distribution which may be false indicators of a safe or unsafe load distribution.

The light tower may comprise a mast actuator or actuation mechanism. The actuator may comprise a ram, such as a hydraulic ram, or electric motor. The mast actuator may drive upward and downward motion of the mast. The actuation system may comprise one or more pulley interposed in the force path between the actuator and the mast. The mast may comprise a plurality of moveable mast sections.

The sensors may take the form of a plurality of force or load sensors distributed at spaced locations about the light tower.

The supports may comprise a plurality of legs and/or feet, which may be adapted to contact the ground, in use. The sensors may sense a load/force for each individual support. The controller may compare the loads on each support so as to determine the weight/load distribution. The acceptable weight/load distribution range may comprise a threshold of acceptable load on each support either individually or relative to one or more further support. A threshold may apply as the load on one or a plurality of supports approaches zero.

The sensors may sense a tensile, compression and/or fluid pressure load for one or more support. The sensors may comprise a hydraulic/pneumatic pressure sensor.

The supports may be actuable. The supports may be actuated between load bearing and non-load bearing conditions, e.g. corresponding to actuated and at-rest conditions. The supports may be hydraulically and/or pivotably actuable. Each support may comprise a piston-and-cylinder arrangement.

The controller may inhibit raising of the mast above its retracted condition until an acceptable load distribution threshold is achieved between the supports. The controller may require that each support bears a predetermined proportion of the weight of the lighting tower, e.g. according to a minimum load value or a minimum proportion of the total load sensed across all supports. This feature may ensure that the mast is established in a safe condition before the mast can be erected and/or used for lighting. This is particularly useful in ensuring the ongoing stability of the mast.

The controller may comprise a start-up or initiation mode of operation in which the controller controls actuation of the supports until a predetermined acceptable load distribution is achieved. The controller may inhibit actuation of the mast whilst the supports are being actuated during start-up.

The plurality of supports may be adapted, individually and/or collectively, to respond to changes in the load distribution of the light tower and/or may be adapted to cause changes in the load distribution of the light tower. For example, the controller may vary the length and/or orientation of the plurality of supports. The supports may be individually pivotable or extendable/retractable.

The controller may be configured to actuate one or more of the plurality of legs when the monitored load distribution is outside the pre-determined range of load distributions, e.g. for longer than a pre-determined period of time. Thus the stability of the light tower may be improved by selectively actuating one or more support, e.g. in response to a change in the load distribution of the tower in use.

The controller may be any appropriate controller, and may comprise one or more processor, or microprocessor or the like. The light tower may comprise separate controllers for altering the load distribution, altering the position of the centre of mass, raising and/or lowering the mast, or varying the length of the plurality of legs, or alternatively may comprise a single controller configured to perform each of these functions.

The light tower may comprise a manual override by which the controller may be overridden. For example a manual release and/or adjustment mechanism for the mast and/or supports may be provided.

The supports may depend from the main body and may be spaced about the perimeter of the main body. Thus the sensing of a load on each support allows the relative direction of loading between the supports to be assessed. The controller may compare a load on one support with a load on one or more adjacent or opposing support. An unstable load distribution may be determined based on a magnitude of the difference between the load on one support and that of one or more other supports.

The controller may be configured to raise and/or lower the mast dependent on a measure of the evenness or unevenness of the load distribution between the plurality of legs. The controller may be configured to raise the mast when the load on each of the plurality of supports is below a pre-determined threshold value, and may, for example, may be configured to raise the mast only when the load on each of the plurality of supports is below a pre-determined threshold value. The controller may be configured to raise the mast when the load on each of the plurality of supports is substantially equal, or within a predetermined threshold/tolerance of being equal.

The main body of the light tower may be portable, and may for example comprise at least one wheel. Regardless of whether or not wheels are provided, the invention is particularly well suited to temporary, semi-permanent and/or mobile light towers. Such towers may be moved between different locations for use, rather than being permanently fixed in any one location.

The lighting tower may comprise a power source for powering the lighting unit and/or one or more actuator. The power source may be housed within the main body of the mobile lighting tower, and may comprise a generator, for example a diesel generator.

The lighting unit may comprise a plurality of lights supported on a common frame structure to the mast. The position/orientation of the lights may be adjustable relative to the mast, and the lights may be individually or collectively rotatable about at least one axis that is substantially parallel or perpendicular to the mast.

The light tower may comprise means for monitoring characteristics of the forces acting on the mast, and a controller configured to raise and/or lower the mast when the monitored characteristics fall outside a range of pre-determined characteristics. For example, the light tower may comprise means for measuring the angle and/or magnitude and/or acceleration of forces acting on the mast. The light tower may comprise a gyroscope or a wind sensor or the like. In such an embodiment having two alternative means for detecting unsafe operating conditions may allow for earlier and/or more certain detection of unsafe conditions, and may provide for a backup means for detecting unsafe operating conditions where one of the means fails.

According to a second embodiment of the present invention there is provided a controller for a mobile light tower, such as a mobile light tower, the controller being configured to alter the load distribution of a mobile light tower when a monitored load distribution of the mobile light tower is outside a pre-determined range of load distributions.

According to a third embodiment of the present invention there is provided a method of controlling a mobile light tower, the method comprising monitoring the load distribution of the mobile light tower and altering the load distribution of the mobile light tower when the monitored load distribution is outside a pre-determined range of load distributions.

According to a fourth embodiment of the invention, there is provided a data carrier comprising machine readable instructions for the operation of a lighting tower controller to operate a lighting tower in accordance with any other aspect of the invention.

Any of the preferential features of the embodiments of the present invention may be equally applied to other embodiments of the present invention, where appropriate.

BRIEF DESCRIPTION OF THE DRAWINGS

Practicable examples of the invention are described in further detail below with reference to the accompanying drawings, of which.

DETAILED DESCRIPTION OF THE INVENTION

Figure 1:
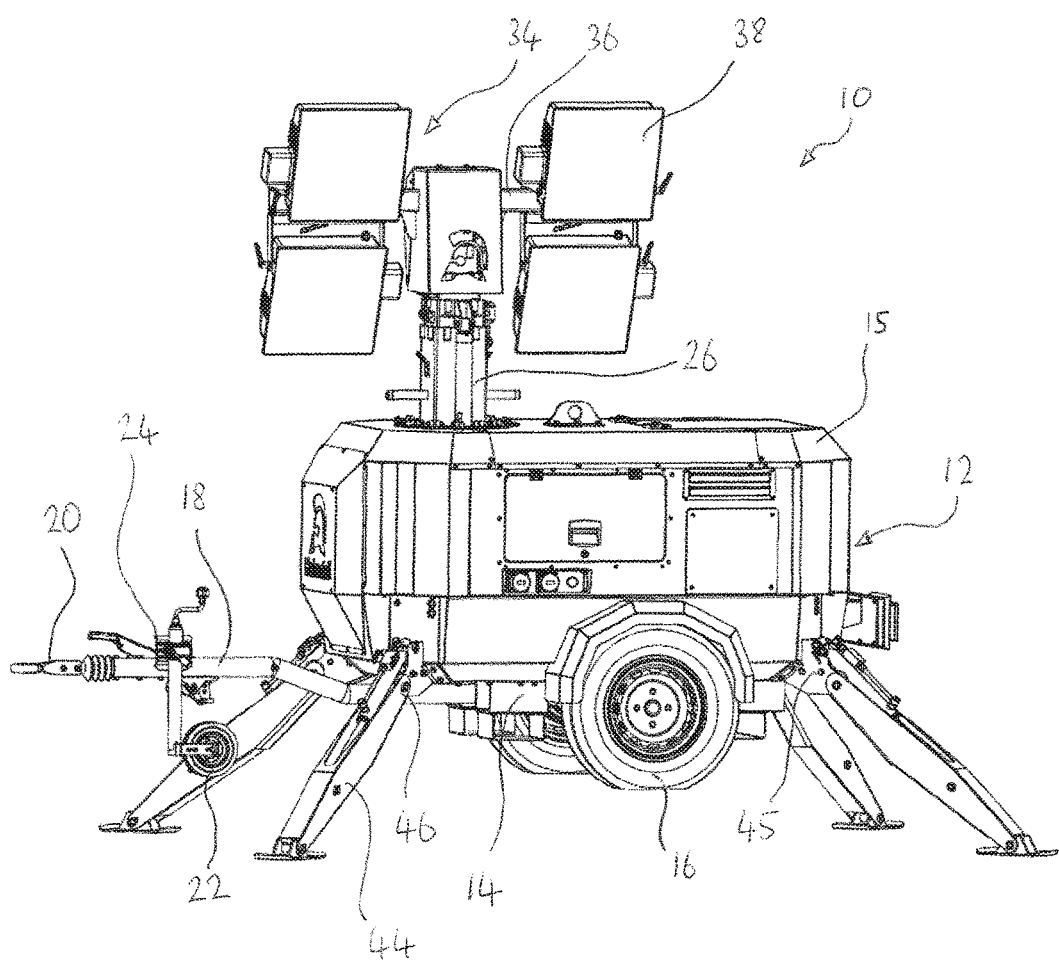
FIG. 1 shows a three-dimensional view of the exterior of a lighting tower according to an example of the invention.
Figure 2:
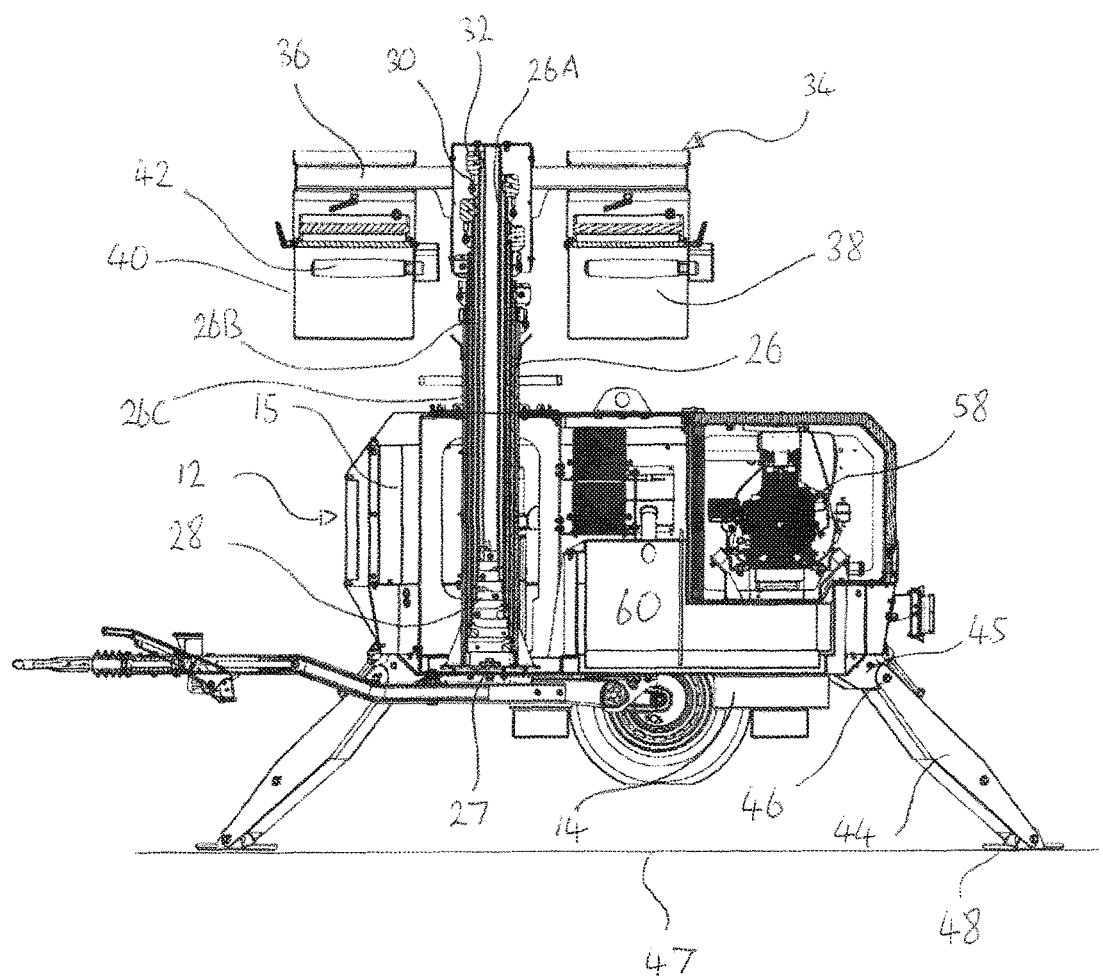
FIG. 2 shows a section view through the lighting tower of FIG. 1.

A mobile lighting tower unit 10 is shown in FIGS. 1 and 2 in a condition ready for use. The lighting tower unit 10 generally comprises a main body 12, which houses the power, actuation and control systems for the lighting tower. The main body 12 comprises a chassis 14 and a casing 15, providing a hollow interior in which the internal systems can be mounted.

A pair of wheels 16 are mounted to the main body 12, e.g. by an axle supported by the chassis so as to allow the lighting unit 10 to roll on its wheels. A tow arm 18 depends from the chassis 14 and allows for connection to a vehicle at a connector formation 20. A caster/wheel 22 is mounted to the tow arm 18 in a conventional manner and is provided with a manual break 24, although such features may optionally be omitted as necessary.

A lighting mast 26 is mounted within the main body 12 such that the mast 26 is upstanding from the chassis and/or casing 15. The lower end of the mast 26 is typically mounted to the chassis, e.g. by one or more fastener. The mast 26 extends upwardly through the casing 15 such that an upper/distal end of the mast protrudes beyond the upper surface of the casing 15. Depending on the type of lighting unit, the mast 26 may be pivotably mounted to the chassis by a pivot pin 27 so as to allow rotation, swiveling of the mast 26 about its elongate axis. This may allow adjustment of the direction of the lights in use.

The mast 26 comprises a plurality of mast sections 26A, 26B and 26C, being respectively inner, intermediate and outer mast sections. The mast sections are each elongate and hollow (e.g. tubular) in form. Each mast section generally matches the sectional profile of the other mast sections, with each being generally rectangular/square in cross section in this example. The mast sections are arranged one within the other about a common longitudinal axis, e.g. such that an outer mast section forms a sleeve about the adjacent inner mast section. Although three mast sections are described here for simplicity, it will be appreciated that a greater number of mast sections may be used if necessary.

The plurality of mast sections collectively provide a telescoping mast structure 26, in which the inner mast sections 26A and 26B may move linearly within the outer mast section 26C. A linear actuator, in this example a hydraulic ram 28 is provided for actuation of the mast sections 26A-C so as to allow raising/lowering of the mast 26. However alternative electrically driven linear, or rotating, drives may be envisioned.

A pulley system is used to transfer the motion/force applied by the mast actuator to each of the mast sections. One or more cable 30 passes through pulleys 32 mounted to the mast sections and is secured to the actuator 28 at one end thereof. The opposing end of the cable may be affixed to the innermost mast section 26A. The cable passes through pulleys on respective upper and lower pulleys/ends of adjacent mast sections such that actuation causes tension in the cable running through the pulley system, thereby causing each inner mast section to extend upwardly relative to its adjacent outer mast section. The pulley system allows the extension distance of the mast to thereby be a respective multiple of the travel distance of the actuator 28.

As well as forcing raising of the mast, the reverse actuation of the ram also allows controlled descent/retraction of the telescoping mast 26.

A lighting rig 34 is supported on the distal/upper end of the mast 26. The lighting rig 34 comprises a support bar or frame 36 to which is attached a plurality of lamps 38 of conventional type. The lamps each comprise a housing 40 within which the light 42 itself is located. The plurality of housings 40 have a frontal area that can expose the lighting tower 10 to significant wind loading in use. Since the lighting rig 34 is spaced from the main body 12 by the mast, wind loading causes a significant moment, particularly when the mast is raised, which can lead to toppling of the lighting unit 10.

The lighting unit comprises a plurality of supports 44 which support the lighting unit 10 on a support surface 47, such as the ground in use. Four supports are provided in this example, with each support 44 depending from a respective cover of the main body 12. Thus the supports 44 are spaced about the periphery of the main body and/or lighting unit as a whole. The supports 44 may be mounted to the main body 12 by suitable bracket formations 45.

The supports 44 are each elongate in form and take the form of legs. Each support is pivotably mounted to the main body at a respective pin joint/hinge 46, e.g. at a proximal end of the leg. Each support has a foot formation 48 at its distal end, which may be pivotably mounted to the leg. Thus the feet can adapt to provide a sure footing on the support surface 47.

Each support 44 is actuable between at-rest and deployed conditions by rotation of the supports about their respective pivots joints 46. This is achieved by a hydraulic actuation system as will be described hereinbelow although alternative, e.g. electrically driven, actuation systems could be substituted as would be understood by the person skilled in the art.

Figure 3:
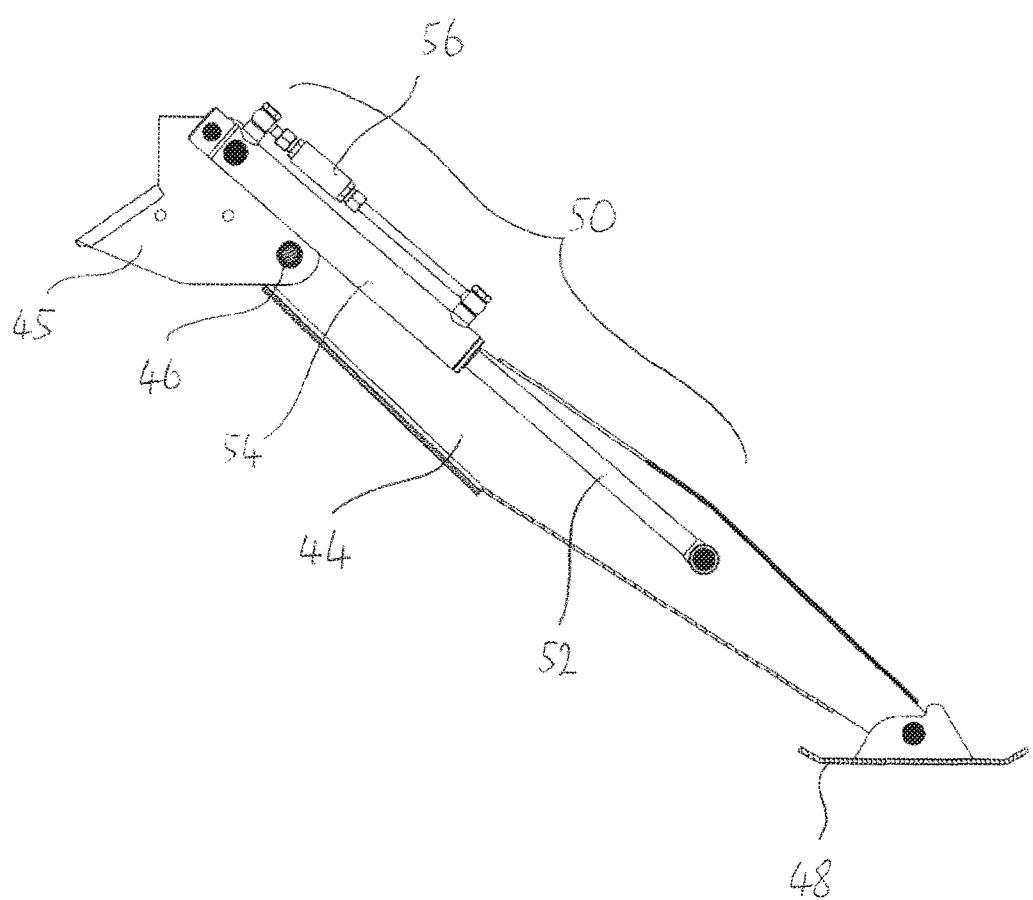
FIG. 3 shows a longitudinal section view through a support for the lighting tower according to an example of the invention; and, FIG. 4 shows a schematic layout of an actuation/control system for a lighting tower according to an example of the invention.

Further detail of each support can be seen in FIG. 3. An actuator 50 on each leg takes the form of a piston in cylinder arrangement. The piston 52 is mounted at one end part-way along the leg, whereas the cylinder 54 is mounted at its opposing end on the main body 12, e.g. on the chassis and/or via bracket 45. It will be appreciated that this mounting arrangement could be reversed.

The piston and cylinder are each pivotably mounted such that, when pressure is applied to the interior of the cylinder 54, the resulting linear motion of the piston causes pivoting of the support 44 about pivot joint 46. In the example shown, extension of the piston 52, i.e. due to increasing pressure in the cylinder, causes lowering of the distal end of the support, i.e. the foot 28.

When all supports 44 are actuated in this manner, the main body is lifted off the ground, i.e. off its wheels 16, and suspended on the supports. In this condition, the supports extend outwardly and downwardly of the main body and collectively bear its weight, e.g. to provide a stable base for use of the lighting tower.

Each support 44 has a load sensor. In this example the load sensor is provided by way of a pressure sensor 56 monitoring the internal pressure within the cylinder 54. However in other examples of the invention, load monitoring for each support could be performed by other sensor means, such as by way of a load cell, strain gauge or the like for each support. A piezo-electric sensor may provide one such suitable strain sensor. Any sensor capable of determining a load applied to, or borne by, each individual support, which can be compared to the corresponding load on other supports as an indicator of weight/load distribution between the supports may be used in conjunction with examples of the invention.

FIG. 2 also shows some internal features of the main body 12, including a diesel generator 58, fuel tank 60 and housing 61 for electrical and/or hydraulic components/circuitry.

Figure 4:
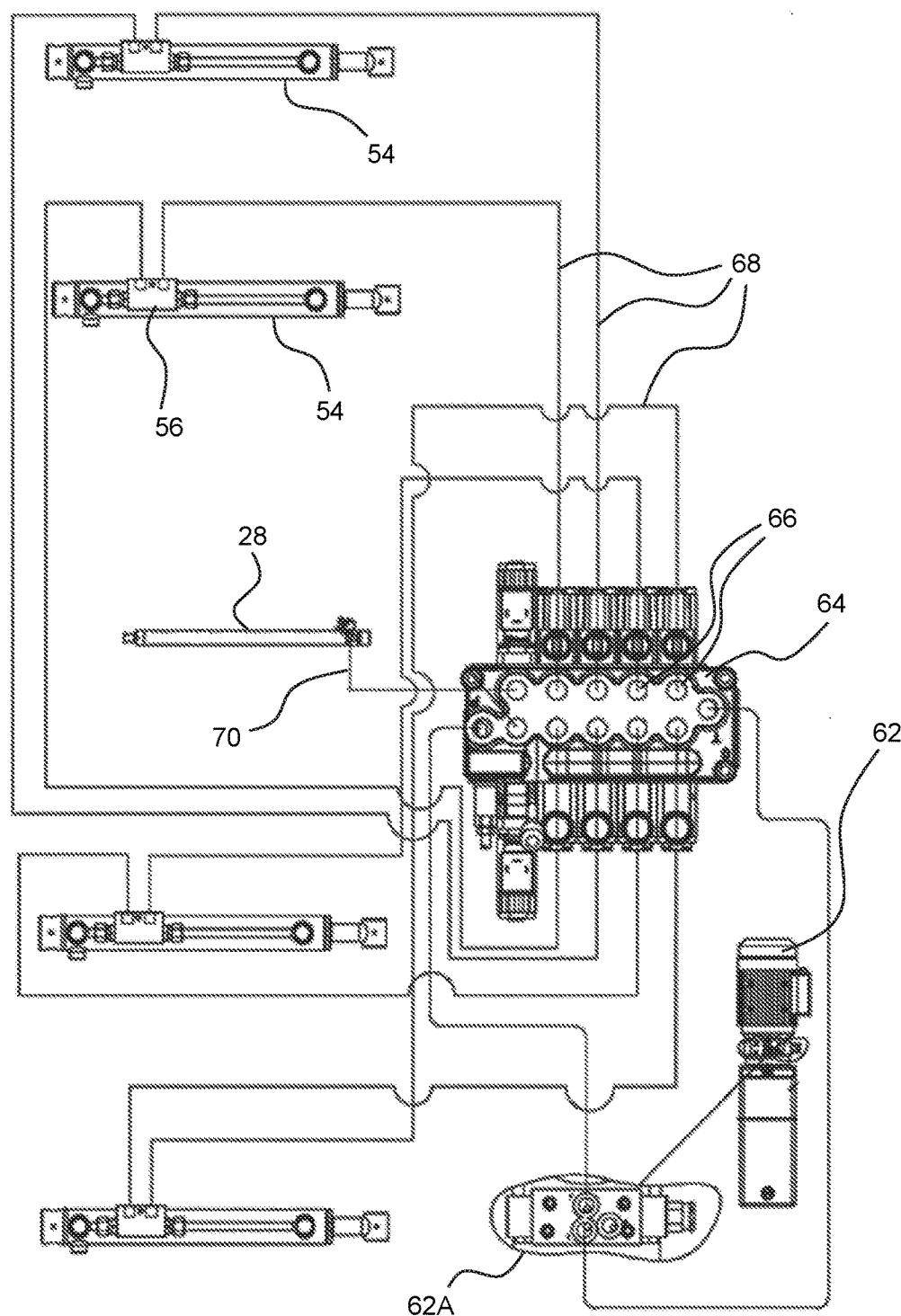

Turning now to FIG. 4, there is shown a schematic of a hydraulic system that may be used in conjunction with examples of the invention. Fluid power is provided by a pump unit driven by electrical power generated by the generator 58, or, if available, by an external power connection. The exploded view 62A shows the outflow and return paths for hydraulic flow lines between the pump 62 and a hydraulic control block 64 such that a closed hydraulic circuit is formed there-between.

The hydraulic control unit 64 comprises a plurality of inlet and outlet ports 66 and a plurality of valves so as to allow control of fluid pressure to flow lines 68 connected thereto. The control unit may comprise a suitable manifold structure for flow communication with the respective ports. Each of the supports 44, i.e. the cylinder 54 thereof, is independently connected to a respective flow port 66 in the control unit 64.

The ram 28 for actuation of the mast 26 is also fluidly connected to a flow port of the control unit by a valved flow line 70. The ram 28 cylinder may also comprise a pressure sensor. Additionally or alternatively one or more sensors/switches may be provided for sensing the height of the mast. Either or both of the ram fluid pressure or mast height could be used as control parameters when adjusting the mast.

One or more processor for the control unit 64 receives the sensor readings from each of the supports 44 and controls actuation of the mast actuator 28 (and/or in some embodiments, actuation of the support actuators 50) in dependence upon those sensor readings. The one or more processor may comprise a programmable chip/microchip. The controller for the system may additionally comprise electronic circuitry associated with the processor (e.g. for transmitting/receiving the relevant electronic signals) as would be understood by the person skilled in the art.

The processor for the control unit also comprises a memory or data store and operates according to machine readable instructions, typically comprising one or more module of machine readable code, so as to determine and instruct actuation of the relevant actuator based on the received sensor readings. Thus actuation of the relevant actuators may be automatic in response to the sensed conditions.

The operation of the control system will now be described in further detail below.

In a start-up mode of operation, the control unit operates according to one or more procedure to ensure that the lighting tower is stably supported on all supports/legs before allowing operation of the mast actuator 28 and/or supplying power to the lights 38.

The start up procedure comprises actuation of each of the support actuators until a load on each support is achieved that is indicative of each support bearing a proportion of the weight of the light tower. The controller may determine form the total load determined for each support whether the entire weight of the light tower is supported by the supports, thus being indicative of a situation in which the main body is elevated off its wheels.

Once the total weight is supported, the controller then assess the relative proportion of the weight borne by each individual support. This can be achieved by comparison of the pressure reading for each support cylinder. The controller then compares the load distribution with a predetermined acceptable load profile. In the event that the load profile acceptance criteria are met, the controller exists the start-up procedure and enables power to be supplied to the mast actuator and/or lights. In the event that the acceptance criteria are not met, the controller may output an alert signal to the user and inhibits power supply to the mast actuator and/or lights. The controller may adjust the degree of actuation (e.g. hydraulic pressure supplied) to one or more supports or may lower the main body, e.g. to restart the start-up procedure.

In one example, the acceptance criteria may require simply that each support bears at least a portion of the weight of the light tower. Additionally o alternatively, the acceptance criteria may require that each support bears a predetermined minimum proportion of the weight, such as, for example greater than 10% or 20% of the weight. The acceptance criteria may be determined according to the relative load/pressure reading for each support, e.g. requiring that the reading for each sensor to be within a predetermined difference of each other concurrent sensor reading, such as within for example 20%, 10%, 5% or potentially less of the other sensor readings.

It has been found that this start-up mode of operation is beneficial in ensuring compliance with safe use guidelines of a lighting tower. Furthermore it has been found that the stability of the tower during initial setup can have a significant impact on the stability of the tower with the lighting mast raised and thus that this aspect of control alone can significantly reduce the risk of topple. For example, the system will automatically determine whether the ground beneath the feet is sufficient to support the lighting tower and/or whether the degree of incline is too great to permit safe use.

Furthermore the system may allow for self levelling upon start-up, or indeed during normal use, by adjusting the degree of actuation for each support until the acceptance criteria are met. In a further development, the controller may adjust the actuation of each support until an optimal condition is achieved, e.g. an equal weight distribution between the plurality of legs or as close to equal as has been found by adjustment of the actuators within a permissible range.

The permissible weight distribution for the start-up procedure may or may not be subject to tighter/stricter requirements than when the mast is raised.

In further examples of the invention, an inclination/inertia/accelerometer sensor may be used in conjunction with the other sensors discussed herein as a further input to the control process during start-up or normal use. Thus an inclination threshold may be used as an additional criterion for determining the acceptability of a weight distribution or orientation of the main body.

Once in normal use, the controller monitors the load/pressure reading on each support either continually or else according to an iterative loop. The monitoring of a plurality of sensor readings in this regard is advantageous since it infers the directionality of any change to the weight distribution of the lighting unit and/or application of an external force. In one simple example the controller may set a base acceptance threshold value for the magnitude of the load on each support.

However in more sophisticated examples, the controller may run one or more algorithm that compares the sensor reading for one support to that of one or more further support, for example adjacent and/or opposite supports with respect to their positioning on the main body. Such a system can therefore take account of directional external loading on the light unit, for example due to wind loading. In one example a reduction in loading on one support in isolation may be acceptable, but when viewed in conjunction with a corresponding reduction or increase in loading on another support, it may lead to an unacceptable weight distribution. Thus the system may be more sensitive and may be able to react more quickly than a system which cannot determine load directionality.

The controller memory comprises one or more model or algorithm defining an acceptable weight/load distribution during normal use. This may be with reference to any of the acceptance criteria described above in relation to the start-up procedure and/or may comprise determination/assessment of the centre of gravity or else the relative changes in loading on supports over time. The frequency of loading changes on one or more support, whether or not in conjunction with the magnitude, may be used as an indicator of an unacceptable loading profile.

In normal use, provided the sensed weight distribution remains within the acceptable weight distribution profile, the controller may allow adjustment of the height of the mast. If the sensed weight distribution falls outside of the acceptable distribution, the controller may automatically lower the mast via actuator 27 until the sensed weight distribution is acceptable. Additionally or alternatively, the controller may adjust the actuation of the individual supports in a manner that evens the weight distribution between the supports. Any such adjustment may only be made within defined upper and lower thresholds in order to ensure that the mast is not subject to the risk of toppling when any external loading is removed. For example such thresholds may be indicative of a maximum permissible deviation in weight distribution in the absence of external loading.

The controller may continually adjust and monitor the mast height i.e. in a continually range-taking manner. Alternatively, there may be a plurality of predetermined height increments, to which the controller automatically adjusts the mast height. In one example, upon sensing of a change in weight distribution of sufficient magnitude and/or over a sufficiently short time period, the controller may automatically lower the mast to a fully retracted condition.

The pre-determined range of acceptable weight/load distributions may be calculated via experimentation, e.g. by an empirical method, and may be implemented by reference to a look up table or database stored in the control unit (e.g. comprising different weight distributions for different mast heights). Alternatively the control method may be implemented by a plurality of control criteria, e.g. according to a hierarchy of control considerations, such that the controller follows a decision process that compares the sensed values against each of said control criteria.

The invention has also been found to be beneficial in that the weight distribution of a lighting tower can vary in use, even in the absence of external forces, for example due to the consumption of fuel, etc. Thus the system proposed by the invention is not geared to any one mode of instability but can assess multiple modes of instability according to a common weight distribution control framework.

The invention also has the additional benefit that it can log records of weight distribution and mast actuation over time such that, in the event of a topple incident or other damage/injury, the logs can be inspected to determine whether the operator was at fault.

In any example of the invention, the control system may output an alert, such as an audible alarm or visible signal (e.g. lights/LEDs) to inform a user that unsafe conditions are prevalent. A user interface may allow a manual override of the automated mast adjustment functions, or else to lock the supports, in case of abnormal conditions or operation. The manual override may simply override the controller, e.g. allowing electrical/hydraulic actuation of the mast under manual control, or else a manually actuated mechanism, e.g. a winch or similar to allow manual raising/lowering of the mast.

The invention claimed is:

1. A light tower comprising:
a main body,
a mast extending from the main body, the mast being extendable between a retracted configuration and at least one extended configuration,
a lighting unit mounted to the mast,
a plurality of supports for supporting the main body in use,
sensors for monitoring the load distribution of the mobile light tower between the supports, and
a controller configured to alter the load distribution of the mobile light tower according to a comparison between the monitored load distribution and a predetermined acceptable load distribution range, wherein the predetermined acceptable load distribution comprises a threshold value of load for each sensor individually and/or a threshold acceptable difference between one sensor and one or more further sensor.

2. A light tower according to claim 1, wherein the controller is configured to alter the load distribution of the light tower when the monitored load distribution is outside the pre-determined acceptable load distribution range.

3. A light tower according to claim 2, wherein the controller is configured to lower the mast from the at least one extended configuration when the monitored load distribution is outside the pre-determined acceptable load distribution range.

4. A light tower according to claim 3, wherein the mast comprises a plurality of extended configurations such that the mast is variably extendable and the controller is configured to lower the mast from a first extended configuration to one or more further extended configurations or the retracted condition in succession until the monitored load distribution is within the pre-determined acceptable load distribution range.

5. A light tower according to claim 1, wherein the controller is configured to permit raising of the mast to the at least one extended condition when the monitored load distribution is within the pre-determined acceptable load distribution range and/or inhibit raising of the mast from the retracted condition when the monitored load distribution is outside the pre-determined acceptable load distribution range.

6. A light tower according to claim 1, wherein the sensors comprise a plurality of load sensors at spaced locations about the light tower, the number of load sensors being at least equal to the number of supports and the controller compares the load sensed by each sensor so as to determine the load distribution.

7. A light tower according to claim 1, wherein the sensors are arranged to sense a load for each individual support.

8. A light tower according to claim 1, wherein the supports are actuable either individually or collectively between a retracted condition and one or more deployed condition.

9. A light tower according to claim 8, wherein the controller is configured to actuate the plurality of supports individually or collectively according to the comparison between the monitored load distribution and a predetermined acceptable load distribution range.

10. A light tower according to claim 1, wherein the sensors comprise fluid pressure sensors.

11. A light tower according to claim 10, wherein each sensor senses pressure within an actuator for corresponding support.

12. A light tower according to claim 1, wherein the supports comprise a plurality of legs depending from the main body so as to support the main body above a support surface in use.

13. A light tower according to claim 1, further comprising at least one wheel, wherein adjustment of the supports allows the weight of the light tower to be selectively borne by at least one wheel or the supports.

14. A light tower according to claim 1, further comprising a generator for powering the lighting unit and/or one or more actuator.

15. A light tower according to claim 1, A light tower comprising:
a main body,
a mast extending from the main body, the mast being extendable between a retracted configuration and at least one extended configuration,
a lighting unit mounted to the mast,
a plurality of supports for supporting the main body in use,
sensors for monitoring the load distribution of the mobile light tower between the supports, and
a controller configured to alter the load distribution of the mobile light tower according to a comparison between the monitored load distribution and a predetermined acceptable load distribution range, the controller having a start-up mode of operation in which actuation of the mast from the retracted condition to the at least one extended condition is inhibited until the monitored load distribution is within the pre-determined acceptable load distribution range.

16. A light tower comprising:
a main body,
a mast extending from the main body, the mast being extendable between a retracted configuration and at least one extended configuration,
a lighting unit mounted to the mast,
a plurality of supports for supporting the main body in use,
sensors for monitoring the load distribution of the mobile light tower between the supports,
a controller configured to alter the load distribution of the mobile light tower according to a comparison between the monitored load distribution and a predetermined acceptable load distribution range; and
a mast actuator under the control of the controller wherein the controller automatically adjusts the length of the mast according to the monitored load distribution.

17. A light tower according to claim 16, wherein the controller is configured to permit extending the mast when the monitored load distribution at a current mast condition has remained within the pre-determined acceptable load distribution range for a predetermined period of time.

* * * * *